US010480951B2

(12) United States Patent
Otero Diaz et al.

(10) Patent No.: US 10,480,951 B2
(45) Date of Patent: Nov. 19, 2019

(54) GENERATING ROUTES USING INFORMATION FROM TRUSTED SOURCES

(71) Applicant: Microsoft Technology Licensing, LLC, Redmond, WA (US)

(72) Inventors: Ana Lilia Otero Diaz, Woodinville, WA (US); David Grochocki, Jr., Seattle, WA (US); Elizabeth Salowitz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 15/296,343

(22) Filed: Oct. 18, 2016

(65) Prior Publication Data

US 2018/0106630 A1    Apr. 19, 2018

(51) Int. Cl.
  *G01C 21/34* (2006.01)
  *H04L 12/58* (2006.01)
  *G01C 21/20* (2006.01)

(52) U.S. Cl.
  CPC ......... *G01C 21/3461* (2013.01); *G01C 21/20* (2013.01); *G01C 21/3484* (2013.01); *H04L 51/20* (2013.01); *H04L 51/32* (2013.01)

(58) Field of Classification Search
  CPC .. G01C 21/3461; G01C 21/3484; H04L 51/32
  USPC ........................................................ 701/533
  See application file for complete search history.

(56) References Cited

U.S. PATENT DOCUMENTS

| 8,306,749 | B1 * | 11/2012 | Petersen | G01C 21/3641 340/988 |
| 10,229,415 | B2 * | 3/2019 | Huyi | G06Q 10/10 |
| 2009/0009321 | A1 * | 1/2009 | McClellan | G08G 1/207 340/539.13 |
| 2009/0157312 | A1 | 6/2009 | Black et al. | |
| 2010/0241723 | A1 * | 9/2010 | Dornbush | G06Q 10/00 709/207 |

(Continued)

FOREIGN PATENT DOCUMENTS

CN        103278168 A        9/2013

OTHER PUBLICATIONS

"Waze—GPS Navigation, Maps & Social Traffic", Published on: Apr. 12, 2016 Available at: https://itunes.apple.com/us/app/waze-gps-navigation-maps-social/id323229106?mt=8.

(Continued)

*Primary Examiner* — Anne M Antonucci
*Assistant Examiner* — James E Stroud
(74) *Attorney, Agent, or Firm* — Holzer Patel Drennan

(57) ABSTRACT

Identifications of areas of interest are received from trusted sources such as contacts in a social networking application. The areas of interest can include geographic boundaries that identify regions such as blocks or portions of streets. The areas of interest can be associated with constraints such as modes of transportation (e.g., car, bicycle, walk, etc.) or times (e.g., 9 am-5 pm, at night, in the morning, etc.), and can be positive or negative (e.g., go here or don't go here). When generating a route for a user, the map application considers the areas of interest based on the constraints associated with the areas of interest and other information such as what mode of transportation that the user is using and when the user is planning on traveling the route.

20 Claims, 10 Drawing Sheets

(56) References Cited

U.S. PATENT DOCUMENTS

| | | | | |
|---|---|---|---|---|
| 2013/0122937 A1* | 5/2013 | Meyer | ............... | G06Q 30/0259 455/456.3 |
| 2014/0278031 A1 | 9/2014 | Scofield et al. | | |
| 2016/0223347 A1 | 8/2016 | Ricci et al. | | |
| 2016/0320196 A9* | 11/2016 | Kunath | ................. | G01C 21/32 |
| 2016/0320198 A1* | 11/2016 | Liu | .................... | G01C 21/3438 |
| 2017/0089711 A1* | 3/2017 | Bae | ................... | G01C 21/3461 |

OTHER PUBLICATIONS

Jules, "6 iPhone / Android Apps to Avoid Traffic Jams", Published on: Feb. 26, 2013 Available at: http://www.quertime.com/article/6-iphone-android-apps-to-avoid-traffic-jams/.

"Google Maps will now give traffic jam alerts and suggest best routes", Published on: Apr. 21, 2016 Available at: http://indianexpress.com/article/technology/tech-news-technology/google-maps-updated-to-give-traffic-jam-alerts-suggest-best-routes/.

Djahel, et al., "A Communications-oriented Perspective on Traffic Management Systems for Smart Cities: Challenges and Innovative Approaches", In Journal of IEEE Communications Surveys & Tutorials, vol. 17, Issue 1, Mar. 2015, 27 pages.

Hsieh, et al., "Route Planning and Visualization Using Geo-Social Media Data", In Proceedings of the 8th International Aaai Conference on Weblogs and Social Media, Jun. 2014, pp. 1-95.

Liebig, et al., "Route Planning with Real-Time Traffic Predictions", In Proceedings of the 16th LWA Workshops: KDML, Sep. 8, 2014, pp. 83-94.

Ali, et al., "CrowdITS: Crowdsourcing in Intelligent Transportation Systems", In Proceedings of IEEE Wireless Communications and Networking Conference: Services, Applications, and Business, Apr. 1, 2012, pp. 3307-3311.

Khokhar, et al., "Fuzzy-assisted social-based routing for urban vehicular environments", In EURASIP Journal on Wireless Communications and Networking, Nov. 23, 2011, pp. 1-15.

Yu, et al., "Personalized Travel PackageWith Multi-Point-of-Interest Recommendation Based on Crowdsourced User Footprints", In Journal of IEEE Transactions on Human-Machine Systems, vol. 46, Issue 1, Feb. 2016, pp. 151-158.

* cited by examiner

1000

GENERATING ROUTES USING INFORMATION FROM TRUSTED SOURCES

BACKGROUND

Users often solicit recommendations from their friends and family when traveling. For example, a user visiting a city may ask their friends for recommendations about areas of the city to visit or for restaurant recommendations. Their friends may respond with recommendations of various places that the user should visit, as well as recommendations of places that the user should not visit (e.g., tourist traps, places associated with traffic congestion, or areas that are under construction).

At the same time, users often rely on map applications associated with their vehicle or phone when traveling. A user enters their location and destination into the map application, and the user is presented with a suggested route. Typically, the suggested route is based on the shortest distance between the location and destination.

While relying on map applications when traveling is useful, with current map applications there is no easy way to incorporate recommendations from friends and family into route calculation. In particular, when the map application is calculating a suggested route, it would be useful for the map application to generate a route that also considers the recommendations from friends and family. For example, if the friends of a user recommend that they drive along a lake when visiting a city and avoid a particular street because of construction, it would be useful for the map application to consider these recommendations when calculating a route so that the route passes the lake and does not use the particular street.

SUMMARY

Identifications of areas of interest are received from trusted sources such as contacts in a social networking application. The areas of interest can include geographic boundaries that identify regions such as blocks or portions of streets. The areas of interest can be associated with constraints such as modes of transportation (e.g., car, bicycle, walk, etc.) or times (e.g., 9 am-5 pm, at night, in the morning, etc.), and can be positive or negative (e.g., go here or don't go here). When generating a route for a user, the map application considers the areas of interest based on the constraints associated with the areas of interest and other information such as what mode of transportation that the user is using and when the user is planning on traveling the route.

In an implementation, a system for generating routes based on information received from trusted sources is provided. The system includes at least one computing device and a map engine. The map engine is adapted to: receive an area of interest from a trusted source, wherein the area of interest includes a time constraint and a transportation mode constraint; receive a request for directions, wherein the request includes a time and a transportation mode; determine that the time constraint and the transportation mode constraint of the area of interest apply to the time and transportation mode included in the request; and in response to the determination, generate a route in response to the request using the area of interest.

In an implementation, a system for generating routes based on information received from trusted sources is provided. The system includes at least one computing device, and a map engine. The map engine is adapted to: present a first route; receive an area of interest from a trusted source, wherein the area of interest includes one or more constraints; determine that the one or more constraints of the area of interest apply to the first route; in response to the determination, generate a second route based on the first route and the area of interest; and present the second route.

In an implementation, a method for generating routes based on information received from trusted sources is provided. The method includes: receiving a request for directions by a computing device, wherein the request includes an origin address and a destination address; selecting one or more areas of interest of a plurality of areas of interest that apply to the request for directions by the computing device; generating a route in response to the request for directions using the selected one or more areas of interest by the computing device, wherein the route includes the origin address and the destination address; and presenting the generated route in response to the request for directions by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
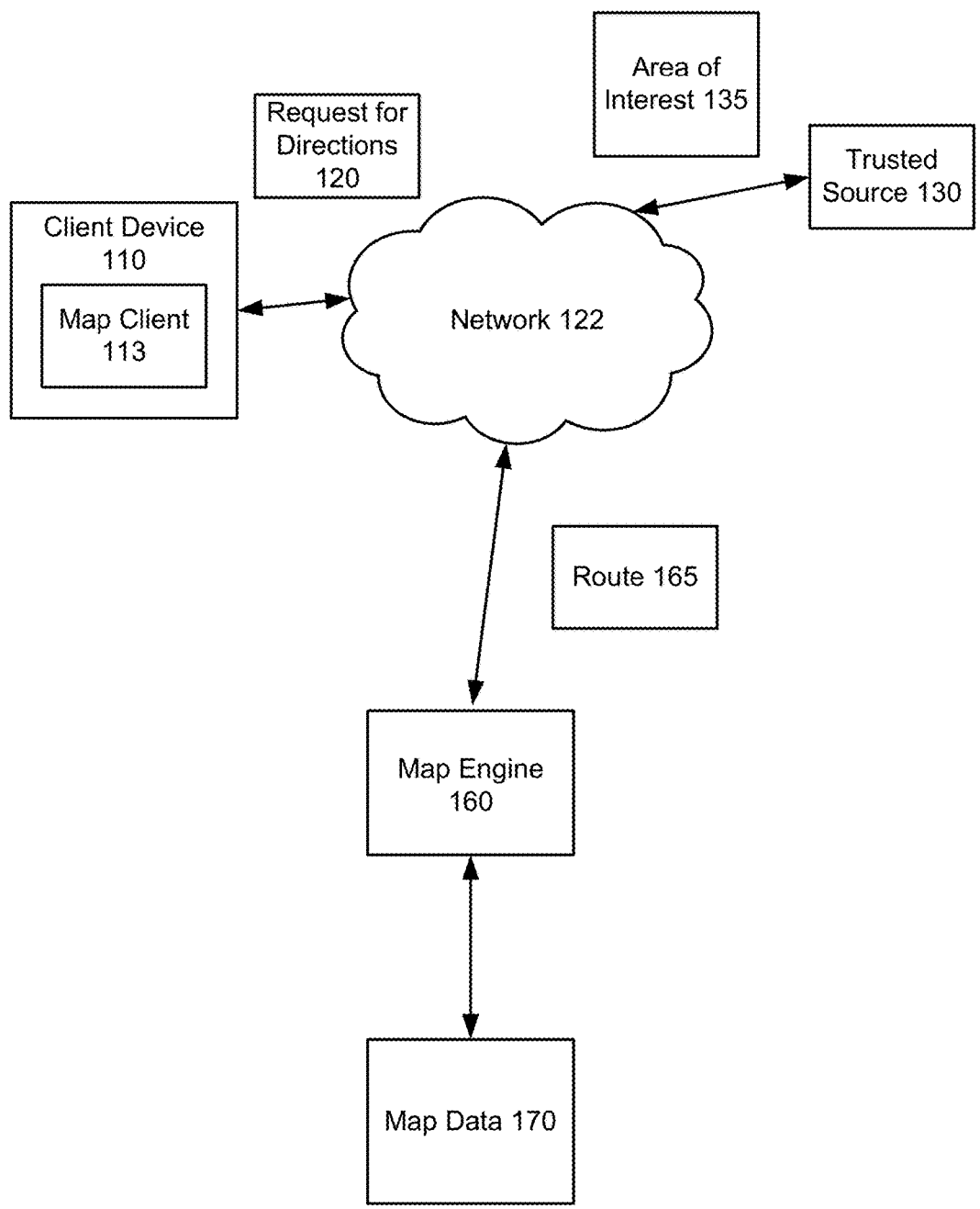
FIG. 1 is an illustration of an exemplary environment for generating routes based on areas of interest.

FIG. 1 is an illustration of an exemplary environment 100 for generating routes 165 based on areas of interest 135. The environment 100 may include a map engine 160, a client device 110, and a trusted source 130 in communication through a network 122. The network 122 may be a variety of network types including the public switched telephone network (PSTN), a cellular telephone network, and a packet switched network (e.g., the Internet). Although only one client device 110, one map engine 160, and one trusted source 130 are shown in FIG. 1, there is no limit to the number of client devices 110, map engines 160, and trusted sources 130 that may be supported.

Figure 10:
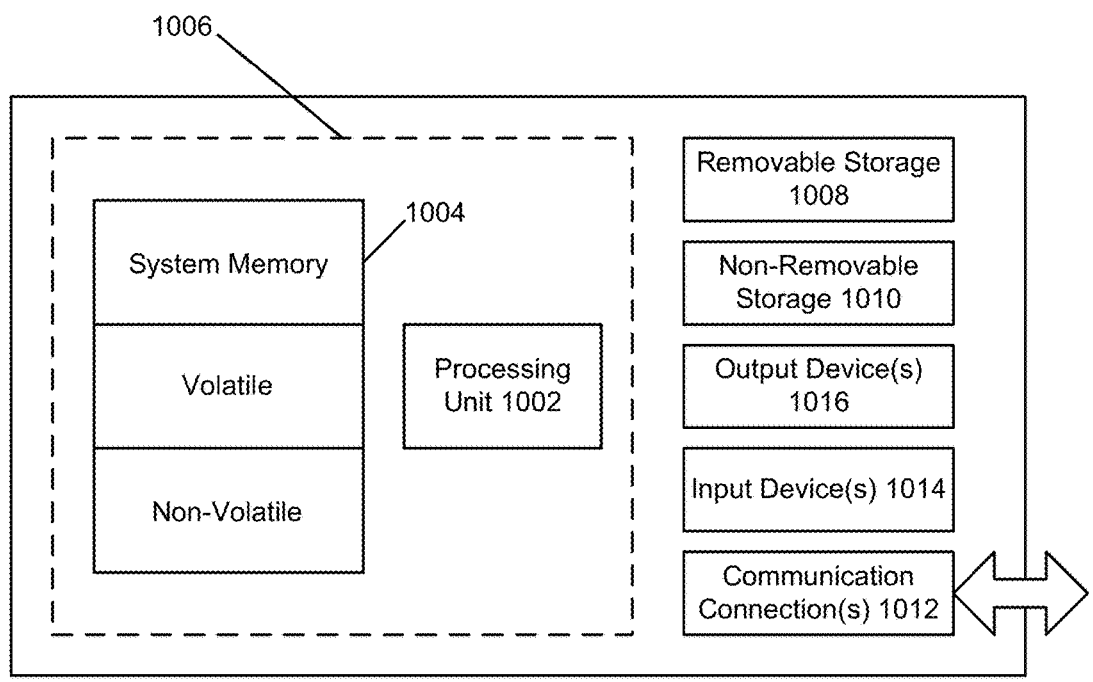
FIG. 10 shows an exemplary computing environment in which example embodiments and aspects may be implemented.

The client device 110, the map engine 160, and the trusted source 130 may be implemented using a variety of computing devices such as smartphones, desktop computers, laptop computers, tablets, and video game consoles. Other types of computing devices may be supported. A suitable computing device is illustrated in FIG. 10 as the computing device 1000.

Each client device 110 may further include a map client 113. The map client 113 may receive requests for directions 120 from a user associated with the client device 110, and in response to the request for directions 120, may present the user with a route 165. The request for directions 120 may include an origin address and a destination address, and the route 165 may be a sequence of roads or paths that connect the origin address and the destination address. Examples of map clients 113 include the map applications associated with many smartphones and vehicle navigation systems.

Users associated with client devices 110 may receive areas of interest 135 from trusted sources 130. A trusted source 130 may be an entity (e.g., user, organization, or business, etc.) that is known or trusted by the user. Examples of trusted sources 130 may include entities that the user has a social networking relationship with (e.g., "friends"), entities that are contacts of the user (e.g., contacts in an email application or a smartphone application, etc.), entities in the same organization as the user (e.g., coworkers, colleagues, or classmates, etc.). Other types of trusted sources 130 may be supported.

The areas of interest 135 may be a region of a map that the trusted source 130 recommends that the user either visit or not visit. The areas of interest 135 may include geographic coordinates, street names whose intersections define an area, or a distance and an address that can be used to define an area around the address. Any system, method, or technique for defining or representing an area on a map may be supported.

Each area of interest 135 may be either a positive area of interest 135 or a negative area of interest 135. A positive area of interest 135 is an area of interest 135 that the associated trusted source 130 is recommending that the user visit, while a negative area of interest 135 is an area of interest 135 that the trusted source 130 is recommending that the user avoid. Examples of negative areas of interest 135 may include areas with traffic jams and areas that are associated with construction.

Each area of interest 135 may be associated with one or more constraints that describe conditions under which the indicated area of interest 135 applies. Example constraints include time constraints and transportation mode constraints. Time constraints may include particular times or durations of time when the associated area of interest 135 may be visited (or not visited). Examples include "after five pm", "between two pm and three pm", "on the weekend", or "in the morning." Where an area of interest 135 does not have a time constraint, it may be assumed to apply to all times, or some default time such as business hours or waking hours.

Transportation mode constraints may include the particular modes of transportation that may be used to visit (or not visit) the associated area of interest 135. Examples may include cars, trucks, bicycles, airplanes, boats, running, jogging, and walking. Any mode of transportation may be supported. Where an indication of an area of interest 135 does not have a transportation mode constraint, it may be assumed to apply to all modes of transportation, or some default modes such as cars or walking.

In some implementations, areas of interest 135 may be provided by trusted sources 130 in a text message such as an e-mail or other electronic message type. For example, a trusted source 130 may send the message "a fun thing to do in Capital City is to drive through the park in the afternoon when it is not crowded." The area of interest 135 in the message is "the park", the time constraint is "the afternoon", and the transportation mode constraint is "drive" or car. The area of interest 135 and associated constraints may be determined automatically by the map client 113 (or map engine 160) using text recognition or other methods for extracting information from text.

In another implementation, the areas of interest 135 may be provided by trusted sources 130 using annotated images or maps that define one or more areas of interest 135. For example, a trusted source 130 may draw shapes around particular regions of a map that they recommend visiting, or areas that are considered "tourist traps" and may be avoided. The trusted source 130 may further provide constraints such as "good for bike riding" or "go in the evening." Depending on the implementation, the trusted source 130 may draw the shapes using a touch-interface associated with a tablet computer or smartphone, for example.

In another example, the areas of interest 135 may be provided by trusted sources 130 using an application or an existing mapping application. For example, a user may select a user-interface element labeled "give advice" in the application, and then the user may select areas of interest from a list of areas of interest (i.e., landmarks), or may draw annotated images of the areas of interest.

As described above, while such areas of interest 135 from trusted sources 130 may provide useful information, especially when traveling to new cities, there currently is no way to incorporate such areas of interest 135 into map applications when providing requests for directions 120. This is particularly problematic for users who rely on map applications while traveling.

Accordingly, to solve the problems associated with map applications, the map engine 160 may generate routes 165 in response to requests for directions 120 that incorporate one or more areas of interest 135 received from trusted sources 130. The map engine 160 may receive areas of interest 135 from trusted sources 130 for a user of a map client 113, and may store the received areas of interests 135 in the map data 170. When a request for directions 120 is received by the map engine 160, the map engine 160 may determine areas of interest 135 that apply to the request for directions 120, and may generate a route 165 that passes through (or does not pass through) one or more of the determined areas of interest 135.

Figure 2:
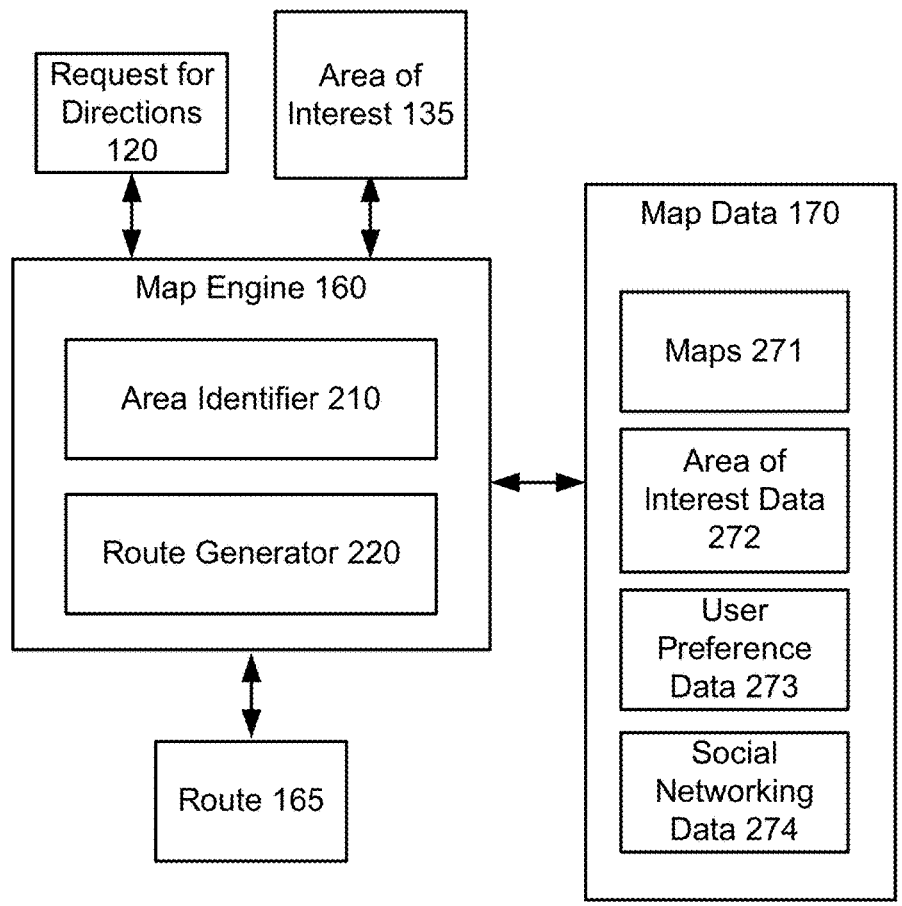
FIG. 2 is an illustration of an implementation of an exemplary map engine.

FIG. 2 is an illustration of an implementation of an exemplary map engine 160. The map engine 160 may include one or more components including an area identifier 210 and a route generator 220. More or fewer components may be included in the map engine 160. Some or all of the components of the map engine 160 may be implemented by one or more computing devices such as the computing device 1000 described with respect to FIG. 10.

The area identifier 210 may identify or determine areas of interest 135 based on information received from trusted sources 130. In some implementations, the trusted sources 130 may provide areas of interest 135 in messages sent to the user of the client device 110. The messages may be sent using a social networking application, or other applications such as e-mail applications and text messaging applications. The area of interest 135 included in a message from a trusted source 130 may define an area and may include one or more constraints such as time constraints and transportation mode constraints. The identified areas of interest 135 may be stored by the area identifier 210 in the area of interest data 272 of the map data 170.

In some implementations, the area identifier 210 may determine an area of interest 135 by parsing a message to look for words and phrases that are indicative of an area or location. These may include words such as "street", road", "park", and "plaza", for example. Other words such as words associated with neighborhood names or other landmarks that may be associated with a particular city or location may be considered. These city specific words may be determined using one or more maps 271 stored in the map data 170. The size of the area may be determined by words and phrases such as "around", "near", "within a few blocks", etc. Any method for extracting relevant words and phrases from text may be used. For example, when the area identifier 210 receives a message such as "avoid downtown during rush hour", the area identifier 210 may determine what city the term "downtown" is referring to. Depending on the implementation, this may be determined using context information. For example, the message may be a response to the user asking about an upcoming trip to Seattle, or the trusted source 130 that provided the message may be from Seattle, which may lead the area identifier 210 to determine that the "downtown" is downtown Seattle. The area identifier 210 may retrieve a map 271 of Seattle, and may use the map to determine the boundaries of Seattle for the area of interest 135.

The area identifier 210 may similarly determine one or more constraints for the determined area of interest 135 by parsing the text of the message. For time constraints, the area identifier 210 may look for words and phrases that are indicative of a time or a time period. For example, the area identifier 210 may look for words or phrases such as "after 5 pm", "on the weekends", "in the morning", "at night", "all day", "late night", and "early". Other words that may imply certain times or time periods include "breakfast", "brunch", "drinks", "happy hour", and "dinner". The particular times and time periods associated with each word or phrase may be set by a user or an administrator. Continuing the example above, the area identifier may determine the words "rush hour" refer to the hours of 7 am-9 am and 4 pm-6 pm on weekdays.

Figure 3:
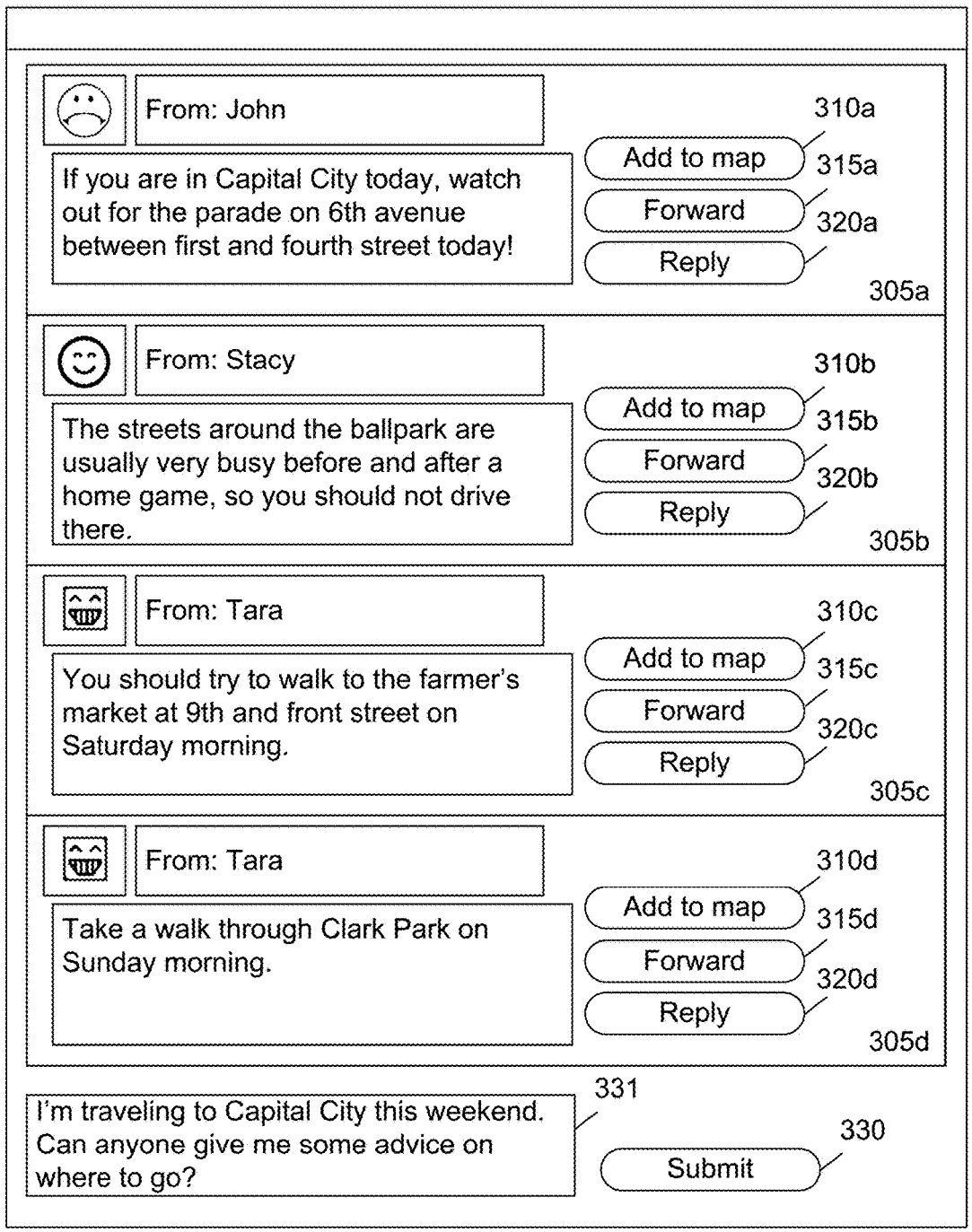
FIG. 3 is an illustration of an example user-interface through which a user can receive messages from trusted sources.

For transportation mode constraints, the area identifier 210 may look for words and phrases that are indicative of transportation modes. For example, the area identifier 210 may look for words or phrases such as "drive", "car", "run", "walk", "bike", "ride", and "stroll". Any method for extracting relevant words and phrases from text may be used. Continuing the example above, the area identifier 210 may determine that the words "rush hour" typically refer to driving. FIG. 3 is an illustration of an example user-interface 300 through which a user can receive messages from trusted sources 130. The user-interface 300 may be associated with a social networking application. The user-interface 300 displays messages 305 (i.e., the messages 305a-d) received from trusted sources 130. In addition, the user-interface 300 includes a user-interface element 331 in which the user associated with the user-interface 300 may compose text for a message, and a user-interface element 330 (e.g., labeled "Submit") that the user may use to generate the message using the text from the user-interface element 331. The user-interface 300 may be presented to a user on the client device 110 by the map client 113.

In the example shown, the user has generated a message asking for advice for their upcoming trip to Capital City. In response, trusted users 130 have generated messages 305 that include areas of interest 135. As shown, each message 305 includes a user-interface element 310 (i.e., the user-interface elements 310a-d) labeled "Add to map" that the user can select to incorporate the associated message 305 into the area of interest data 272 associated with the user. In addition, each message 305 includes a user-interface element 315 (i.e., the user-interface elements 315a-d) (e.g., labeled "Forward") that the user can select to forward the associated message 305 to other trusted sources 130, and includes a user-interface element 320 (i.e., the user-interface elements 320a-d) (e.g., labeled "Reply") that the user can select to reply to the associated message 305.

In response to the user selecting the user-interface element 310 of a message 305 (or automatically and without user action), the area identifier 210 may identify the area of interest 135 from the associated message 305, and may store the identified area of interest 135 in the area of interest data 272.

Using the example from the message 305a, the area identifier 210 may parse the text of the message 305a to determine the area of interest 135 as "6th avenue between first and fourth street." The area identifier 210 may further parse the text of the message 305a to determine that the time constraint associated with the area of interest 135 is "today". Because no explicit transportation constrain is in the text of the message 305a, the area identifier 210 may set the transportation constraint as all modes of transportation, or some default mode such as "vehicle", for example. In addition, because of the phrase "watch out", the area identifier 210 may determine that the area of interest 135 is a negative area of interest 135 and may be avoided.

Using the example from the message 305b, the area identifier 210 may parse the text of the message 305b to determine the area of interest 135 as "the streets around the ballpark." Based on settings related to what is meant by "around", the area identifier 210 may determine the area of interest 135 as some number of blocks surrounding an address associated with the ballpark. Depending on the implementation, the location of the "ballpark" may be determined using location data such as one or more maps 271 that may be stored in the map data 170. Because of the phrase "should not", the area identifier 210 may determine that the area of interest is a negative area of interest 135 and may be avoided.

The area identifier 210 may parse the text of the message 305b to determine that the time constraint associated with the area of interest 135 is "before and after a home game." Accordingly, the area identifier 210 may determine the dates and times of any upcoming games at the ballpark, and may calculate the time constraints based on the determined dates and time. The area identifier 210 may determine the dates and times using the Internet, or some other publicly available database. The transportation constraint associated with the area of interest 135 is clearly indicated by the term "drive".

Using the example from the message 305c, the area identifier 210 may parse the text of the message 305c to determine the area of interest 135 as "the farmers market at 9th and front street." The area identifier 210 may parse the text of the message 305c to determine that the time constraint associated with the area of interest 135 is "Saturday morning". The transportation constraint associated with the area of interest 135 is indicated by the term "walk". Because of the phrase "should try", the area identifier 210 may determine that the area of interest is a positive area of interest 135.

Using the example from the message 305d, the area identifier 210 may parse the text of the message 305d to determine the area of interest 135 as "Clark Park." The area identifier 210 may parse the text of the message 305a to determine that the time constraint associated with the area of interest 135 is "Sunday Morning". The transportation constraint associated with the area of interest 135 is indicated by the term "walk". Because of the phrase "Take a", the area identifier 210 may determine that the area of interest is a positive area of interest 135.

Returning to FIG. 2, the area identifier 210 may also determine areas of interest 135 from annotations on images or maps received from trusted sources 130. For example, a trusted source 130 may indicate an area of interest 135 on a map by drawing an outline of the area of interest 135. The trusted source 130 may include text that describes the area of interest 135 annotated on the map and may include constraints such as time and transportation constraints.

Figure 4:
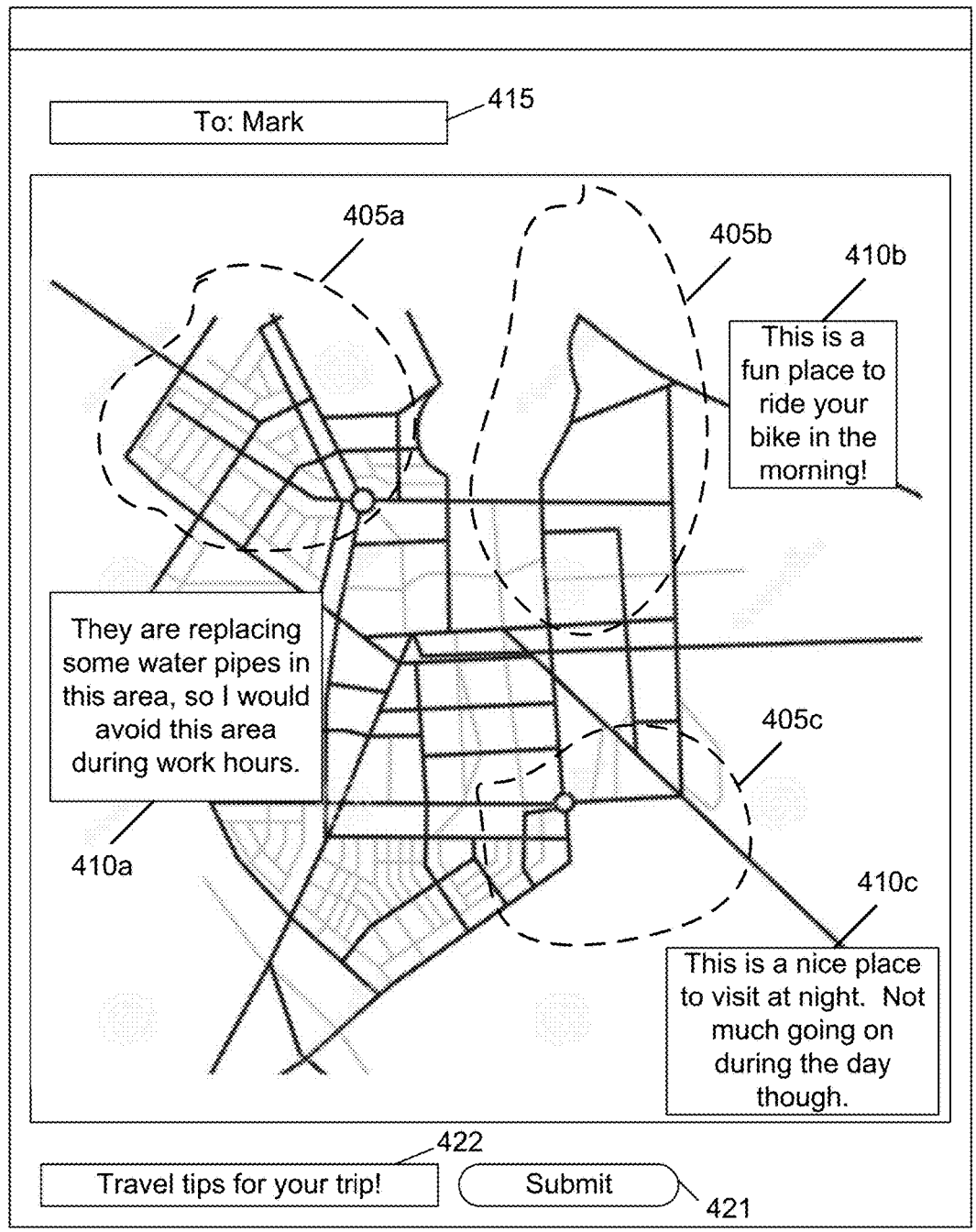
FIG. 4 is an illustration of an example user-interface through which a trusted source can provide areas of interest by annotating an image.

For example, FIG. 4 is an example of a user-interface 400 through which a trusted source 130 can provide areas of interest 135 by annotating an image. The user-interface 400 includes a user-interface element 415 that may be used to indicate the name of the recipient that will receive the areas of interest 135. In the example shown, the trusted source 130 has typed the recipient "Mark" into the user-interface element 415.

The user-interface 400 allows the trusted source 130 to draw, using a mouse, touch-interface, or other interface, a region 405 for each area of interest 135 on an image of a map. In the example shown, the trusted source 130 has drawn three regions 405 (i.e., the regions 405a, 405b, and 405c) on an image of a map of Capital City.

The user-interface 400 further allows the trusted source 130 to provide descriptions 410 about each of the regions 405. As shown, the trusted source 130 has provided descriptions 410 (i.e., descriptions 410a, 410b, and 410c). Depending on the implementation, the trusted source 130 may type each description 410, or may draw the descriptions 410 similarly as the regions 405.

The user-interface 400 further includes a user-interface element 422, where the trusted source 130 can enter a title or other information about the annotated image. After completing the annotated image, the trusted source 130 can send the annotated image, including the regions 405 and associated descriptions 410, to a user by selecting or touching the user-interface element 421 labeled "Submit."

The area identifier 210 may receive an annotated image, and may identify one or more areas of interest 135, including constraints, from the annotated image. Depending on the implementation, the area identifier 210 may identify an area of interest 135 for each defined region of the annotated image. Thus, using the example annotated image of FIG. 4, the area identifier 210 may identify an area of interest 135 for each of the regions 405a, 405b, and 405c.

In some implementations, for each region of the annotated image, the area identifier 210 may try to identify an area of interest 135 that best fits the region. For example, the area identifier 220 may attempt to determine a set of street boundaries that approximate the region. Accordingly, the area of interest 135 identified for a particular region may be larger or smaller than the corresponding region on the annotated image.

The area identifier 210 may determine that an area of interest 135 is a negative area of interest 135 or a positive area of interest 135 based on the descriptive information 410 associated with the region 405 that the area of interest 135 was identified from. Depending on the implementation, the area identifier 210 may parse the descriptive information 410 for words or phrases that are positive or negative to make the determination.

Returning to the example shown in FIG. 4, the area identifier 210 may determine that the regions 405b and 405c correspond to positive areas of interest 135 because of the use of positive words in the associated descriptions 410 such as "fun place" and "nice place." Similarly, the area identifier 210 may determine that the region 405a corresponds to a negative area of interest 135 because of the use of negative words in the associated description 410 such as "avoid this area." Other methods may be used.

The area identifier 210 may determine one of more constraints for an area of interest 135 based on the description 410 associated with the region 405 that the area of interest 135 was identified in. Similar to the messages, the constraints may be determined by the area identifier 210 parsing the text of the descriptions 410 for particular words or phrases.

For example, with respect to transportation constraints, the area identifier 210 may determine a transportation constraint of "bike" from the description 410b. The descriptions 410a and 410c do not indicate any particular transportation modes, so the area identifier 210 may determine that all transportation constraints may apply.

With respect to time constraints, the area identifier 210 may determine a time constraint of 9 am-5 pm on weekdays from the description 410a based on the phrase "during work hours." The area identifier 210 may determine a time constraint of 6 am-12 pm from the description 410b based on the phrase "in the morning." The area identifier 210 may determine a time constraint of 6 pm-3 am from the description 410b based on the phrase "at night."

The route generator 220 may generate routes 165 in response to requests for directions 120. A request for directions 120 may include an origin address and a destination address. Depending on the implementation, a user may enter the origin address and the destination address into the map client 113 associated with a client device 110. Alternatively, or additionally, the map client 113 may determine the origin address automatically using a GPS associated with the client device 110. Other location determination techniques may be used.

The request for directions 120 may be associated with a time and a mode of transportation. Depending on the implementation, the time may be the current time when the user submitted the request for directions 120, or may be a later time that is selected by the user. For example, a user may indicate that the directions are for a particular time or date in the future.

The mode of transportation associated with a request for directions 120 may be the mode of transportation that the user intends on using to follow the generated route 165. The modes of transportations may include automobile, bike, walk, run, public transportation, etc. In some implementations, the mode of transportation may be automatically determined by the map client 113 based on the client device 110. For example, where the client device 110 is a navigation system of a car, the map client 113 may automatically determine the mode of transportation to be automobile. Alternatively, the user may select the mode of transportation when creating the request for direction 120.

The route generator 220 may generate routes 165 in response to requests for directions 120 based on one or more areas of interest 135 that are associated with the user that generated the request for directions 120. When a request for directions 120 is received, the route generator 220 may identify areas of interest 135 that are associated with the user that generated the request from the area of interest data 272. As described above, one or more trusted users 130 may have provided areas of interest 135 for the user.

Of the areas of interest 135 that are associated with the user, the route generator 220 may select areas of interests that are applicable to the current request for directions 120. Depending on the implementation, an area of interest 135 is applicable to a request if the time and transportation mode associated with the request for directions 120 match the time and transportation constraints associated with the area of interest 135. For example, an area of interest that is a drive through the park in the morning would apply to a request for directions 120 received at gam for a drive, but not a request for directions 120 received at 2 pm for a walk.

In addition, other factors may be used to select areas of interest 135 such as distance. For example, the route generator 220 may select areas of interest 135 that are within some threshold distance of either the origin address or the destination address of the request for directions 120. The threshold distance may prevent users from traveling too far out of their way to visit (or not visit) a particular area of interest 135. The threshold distance may be set by a user or an administrator, and may change based on the transportation mode associated with the request for directions 120. For example, the threshold distance used when the transportation mode is driving may be larger than the threshold distance used when the transportation mode is walking.

In some implementations, the route generator 220 may use some or all of the selected areas of interest 135 when generating a route 165. The route generator 220 may generate a route 165 that starts at the origin address of the request 120, and ends at the destination address of the request 120. In the case of positive areas of interest 135, the route 165 may pass through some or all of the positive areas of interest 135 of the selected areas of interest 135. In the case of negative areas of interest, the route 165 may not pass through some or all of the negative areas of interest 135 of the selected areas of interest 135. The route generator 220 may generate routes 165 from maps 271 using a variety of route and map planning techniques.

As may be appreciated, it may be difficult for the route generator 220 to generate a route 165 that considers all of the selected areas of interest 135. For example, such a route 165 may become unduly long. Accordingly, the route generator 220 may only consider a subset of the selected areas of interest 135. Depending on the implementation, there may be a maximum number of areas of interest 135 that may be used to generate a route 165. Alternatively, the route generator 220 may generate a route 165 using rules such as generating the route 165 that incorporates the greatest number of areas of interest 135 without being longer than some percentage of an optimal route 165. The optimal route 165 may be the shortest distance between the origin address and the destination address, for example. Alternatively, the optimal route 165 may be the route that is estimated to take the shortest amount of time. Other criteria for determining an optimal route 165 may be used.

Where the number of areas of interest 135 that may be incorporated into a route 165 is limited, the route generator 220 may further rank the areas of interest 135, and may select the areas of interest 135 based on the generated ranking. The ranking may attempt to predict which areas of interest 135 the user may actually be interested in visiting (or avoiding). In one implementation, the areas of interest 135 may be ranked based on one or both of user preference data 273 and/or social networking data 274.

The user preference data 273 may include information about the user associated with the request for directions 120 (e.g., occupation, hobbies, interests, geographic location). Depending on the implementation, the user preference data 273 may be provided by the user (e.g., in a profile associated with the user), or may be determined or inferred by the route generator 220. For example, the route generator 220 may determine the user preference data 273 for a user based on areas of interest 135 that the user has visited in the past or that the user has recommended to other trusted sources 130. Other types of signals may be used to generate the user preference data 273.

The social networking data 274 may be similar to the user preference data 273 and may include information from one or more social networking applications such as profile information associated with the user, "friends" or contacts of the user in the one or more social networking applications, topics that the user has "liked" or shown an interest in the one or more social networking applications, and any other information that may be associated with or collected by social networking applications.

The user preference data 273 and/or social networking data 274 may be used by the route generator 220 to rank the selected areas of interest 135 for the user. For example, the user preference data 273 may indicate that the user is interested in shopping, but does not enjoy nature or outdoor activities. Accordingly, the route generator 220 may rank an area of interest 135 of visiting a popular shopping street higher than an area of interest 135 of visiting a park.

As may be appreciated, the user preference data 273 and/or social networking data 274 may be personal and private. Accordingly, to protect the privacy of the user, all of the user preference data 273 and/or social networking data 274 may be encrypted. Moreover, before any user preference data 273 and/or social networking data 274 is collected and used by the route generator 220, the user may be asked to opt-in or otherwise consent to the use of such data.

Other information may be incorporated into the ranking by the route generator 220. In some implementations, trusted sources 130 may give "likes" or "hearts" to areas of interest 135 suggested by other trusted sources 130. Areas of interests 135 having a high number of "likes" may be ranked higher than areas of interest 135 having a low number of "likes." In other implementations, certain types of areas of interest 135 may be prioritized higher than others. For example, negative areas of interest 135 associated with delays such as traffic jams, traffic accidents, and road construction may be prioritized so that they are ranked higher than other types of areas of interest 135. The relative prioritization of areas of interest 135 may be set by a user or an administrator.

The route generator 220 may present a generated route 165 to the user that provided the request for directions 120 using the map client 113. In one implementation, a single route 165 may be presented to the user. In addition, some or all of the areas of interest 135 that were used to generate the route 165 may be displayed and described to the user. For example, the areas of interest 135 may be highlighted on a map along with the route 165, and some descriptive information may be presented about each area of interest 135. The descriptive information may include the original message associated with the area of interest 135 and the name of the trusted source 130 that originally recommended the area of interest 135.

In another implementation, the route generator 220 may provide multiple generated routes 165 to the user through the map client 113. The user may be presented with one or more routes 165, each based on different areas of interest 135. Each route 165 may be presented with descriptive information and some indication of how long the route 165 is estimated to take. For example, the map client 113 may display each of the routes 165 on a map using a different color. The user may select a displayed route 165 to view the areas of interest 135 associated with the selected route 165. In addition, the map client 113 may display an optimal route 165. The optimal route 165 may be based on a variety of metrics such as the shortest route, the fastest route, the route with the least expected traffic, the route with the fewest tolls, or the route with the fewest transfers. Other metrics or combinations of metrics may be considered. The user may select the route 165 that they want to use for their trip from the routes 165 displayed by the map client 113.

The route generator 165 may modify a route 165 in real-time as new areas of interest 135 are received from trusted sources 130. For example, a user may be traveling using a route 165 presented by the map client 113. During the trip, a trusted user 130 may provide a message that an accident has occurred and that traffic is very bad in a particular area of town. In response, the area identifier may identify a negative area of interest 135 corresponding to the particular area of town, and may provide the area of interest 135 to the route generator 220.

The route generator 220 may determine if the current route 165 passes through the area of interest 135. If the current route 165 passes through the area of interest 165, the route generator 220 may generate a new route 165 that avoids the area of interest 165.

Figure 5:
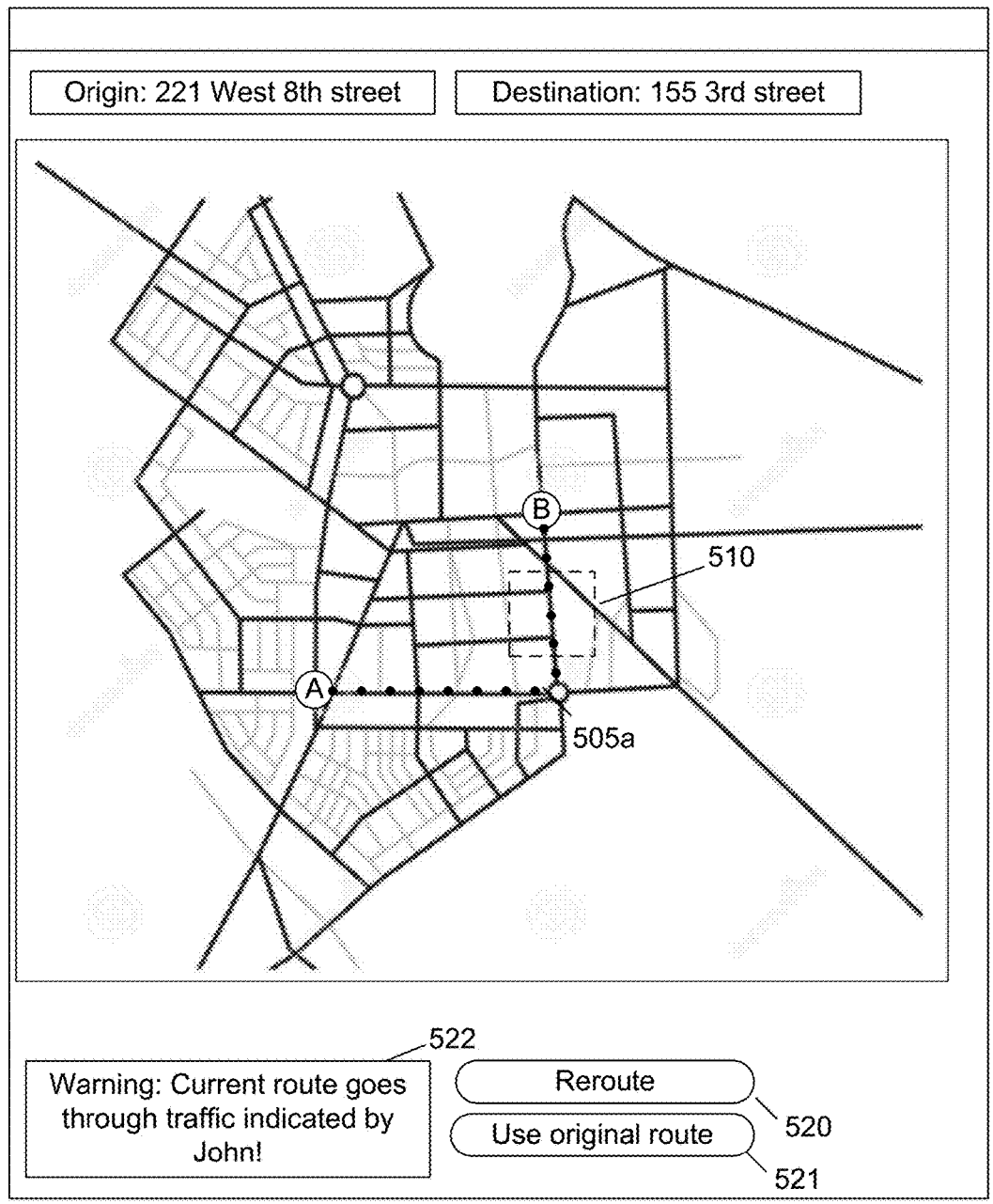
FIG. 5 is an illustration of an example user-interface that facilitates the real-time updating of routes in response to new areas of interest.

FIG. 5 is an illustration of a user-interface 500 that facilitates the real-time updating of routes 165 in response to new areas of interest 165. The user-interface 500 may be generated and presented by the map client 113. In the example shown, a user is traveling on a route 165 indicated by the dotted line 505a on a displayed map. The origin address of the route 165 is "221 West 8th street" and is shown on the map as "A". The destination of the route 165 is "155 3rd street" and is shown on the map as "B".

At some time during the route 165, the route generator 220 may receive a new area of interest 135 from the area identifier 135. The received area of interest 135 may have been created by a trusted source 130 "John" and may indicate that traffic has been detected in the corresponding region 510 shown on the map. In response, the map client 113 has displayed a window 522 in the user-interface 500 that includes the warning "Current route goes through traffic indicated by John".

In the example shown, the map client 113 has displayed a user-interface element 520 labeled "Reroute" that the user can select to have a new route 165 generated that does not pass through the region 510 of the map. The map client 113 has also displayed a user-interface element 521 labeled "Use original route" that the user can select to ignore the warning and remain on the route 165 indicated by the dotted line 505a that passes through the region 510. Because the area of interest 135 is provided by a trusted source 130 "John" rather than anonymous users who may not be known to the user, the user may be likely to trust the warning from the map client 113. This is in contrast to systems that base warnings or recommendations on "crowdsourced" information from users who are not known by the user.

Figure 6:
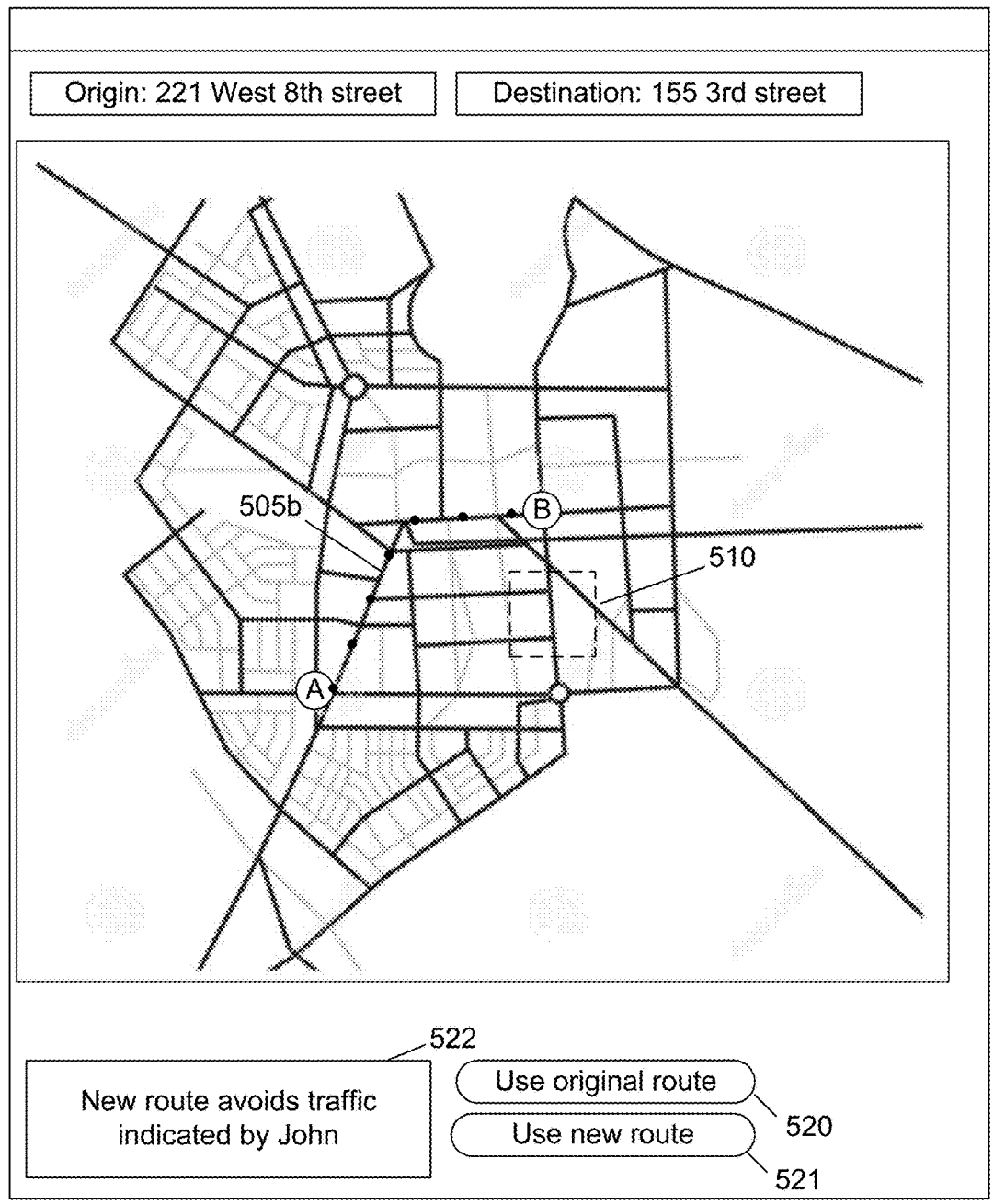
FIG. 6 is another illustration of an example user-interface that facilitates the real-time updating of routes in response to new areas of interest.

Continuing to FIG. 6, the user has selected the user-element 520 and the route generator 220 has generated a new route 165 as indicated by the dotted line 505b that avoids the region 510. The window 522 now includes text that explains that the "New route avoids traffic identified by John." The user can use the new route 165 by selecting the user-interface element 521, or use the original route 165 by selecting the user-interface element 520.

Figure 7:
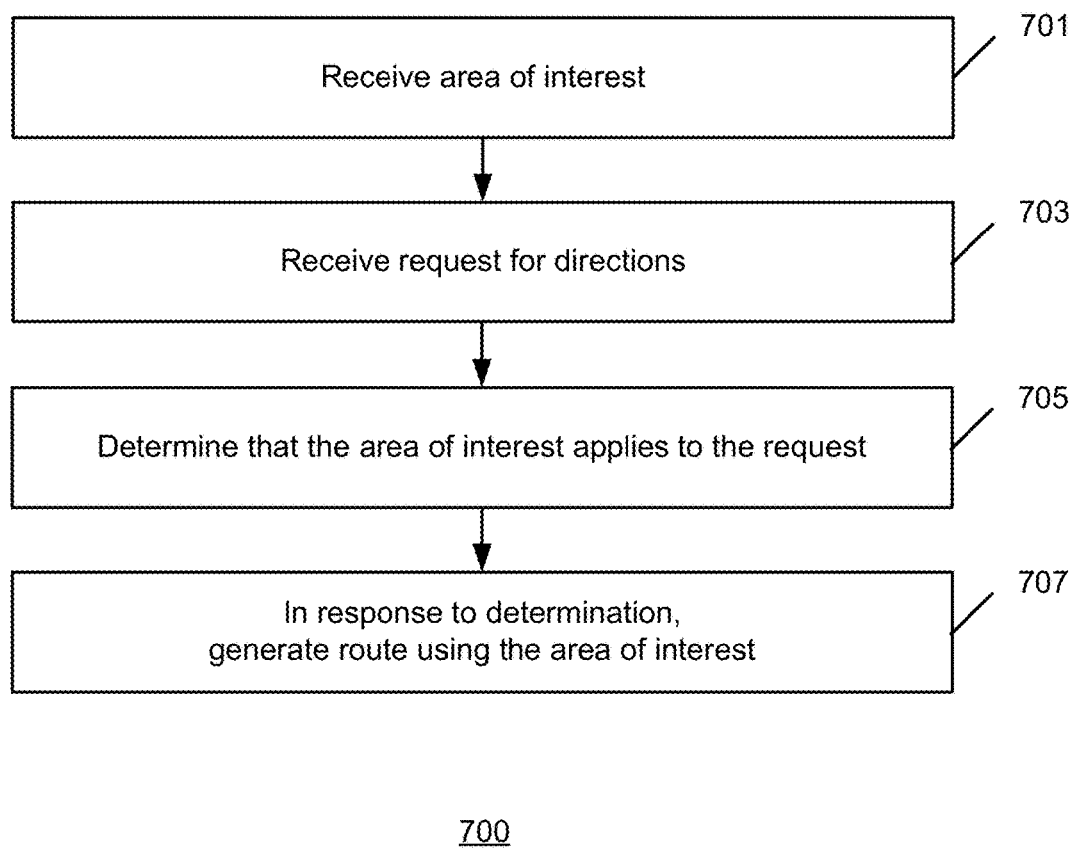
FIG. 7 is an operational flow of an implementation of a method for generating a route using an area of interest.

FIG. 7 is an operational flow of an implementation of a method 700 for generating a route using an area of interest. The method 700 may be implemented by the map engine 160.

At 701, an area of interest is received. The area of interest 135 may be received from a trusted source 130 by the area identifier 210 of the map engine 160. The area of interest 135 may identify an area or region on a map and may be associated with time constraints and transportation constraints. The area of interest 135 may be a positive area of interest 135 or a negative area of interest 135. The trusted source 130 may be a contact in social networking application, for example.

In some implementations, the areas of interest 135 may be received in messages from the one or more trusted sources 130. Alternatively, or additionally, the areas of interest 135 may be received as annotated images or maps where the trusted sources 130 circle or otherwise indicate the boundaries of each of the areas of interest 135 on the image. Other methods for receiving areas of interest 135 may be supported.

At 703, a request for directions is received. The request for directions 120 may be received by the route generator 220 of the map engine 160. The request for directions 120 may include an origin address and a destination address. The request for directions 120 may be received from a map client 113 such as a navigation application or a map application.

The request for directions 120 may be associated with a time and a transportation mode. Depending on the implementation, the time may be the time that the request 120 was generated, or may be some future time that is set by the user that generated the request 120. The transportation mode may the mode of transportation that the user plans to use to travel the generated route 165. Examples may include walk, drive, bike, etc.

At 705, that the area of interest applies to the request is determined. The determination may be made by the route generator 220 of the map engine 160. The area of interest 135 applies to a request when the transportation and time constraints associated with the area of interest 135 match the time and transportation mode associated with the request for directions 120. Other criteria may be used.

At 707, a route is generated using the area of interest in response to the determination. The route 165 may be generated by the route generator 220 of the map engine 160. Where the area of interest 135 is a positive area of interest 135, the route generator 220 may generate a route 165 that passes through the area of interest 135. Where the area of interest 135 is a negative area of interest 135, the route generator 220 may generate a route 165 that does not pass through the area of interest 135. The generated route 165 may begin at the origin address associated with the request 120 and end at the destination address associated with the request 120.

Figure 8:
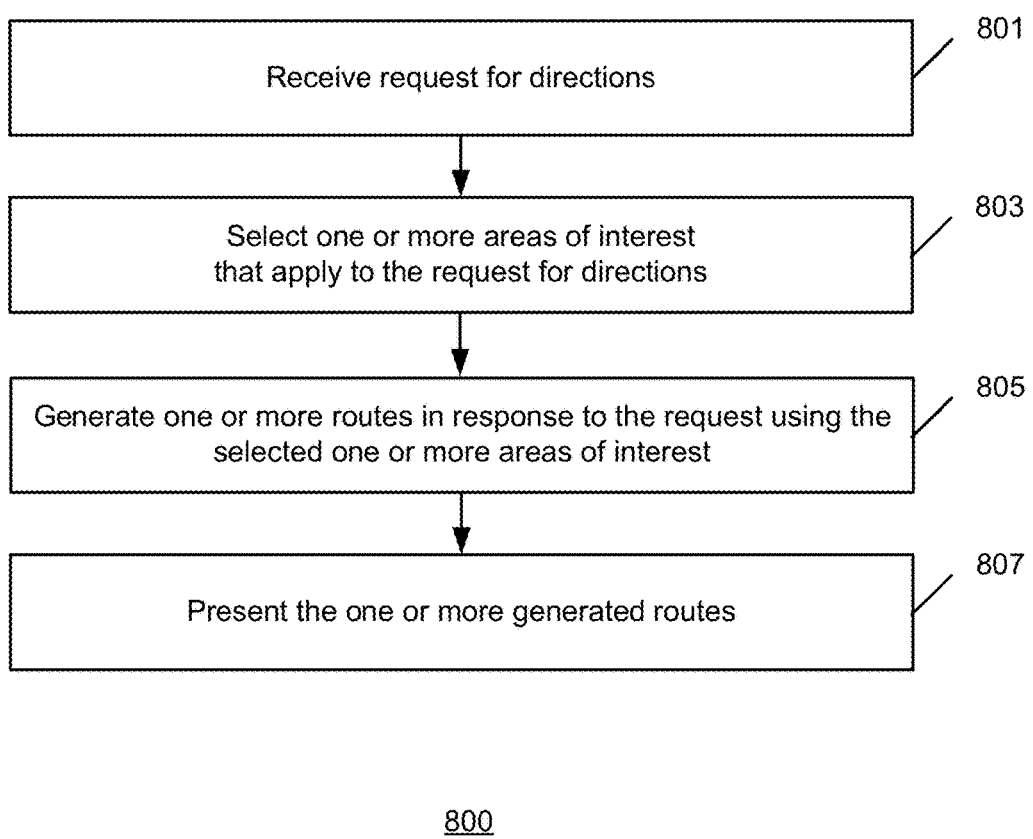
FIG. 8 is another operational flow of an implementation of a method for generating a route using an area of interest.

FIG. 8 is an operational flow of an implementation of a method 800 for generating a route using an area of interest. The method 800 may be implemented by the map engine 160.

At 801, a request for directions is received. The request for directions 120 may be received by the route generator 220 of the map engine 160 from a map client 113. The request for directions 120 may be associated with a user. The request 120 may include an origin address and a destination address. The request 120 may be associated with a time and a transportation mode.

At 803, one or more areas of interest that apply to the request for directions are selected. The one or more areas of interest 135 that apply to the request for directions 120 may be selected by the route generator 220 of the map engine 160. The areas of interest 135 may be selected from the area of interest data 272. Whether or not an area of interest 135 applies to the request for directions 120 may depend on the time and transportation modes associated with the request for directions 120.

As may be appreciated, because of the large number of areas of interest 135 that may be selected, the route generator 220 may rank the selected areas of interest 135. The ranking may reflect how likely the user associated with the request for directions 120 is to enjoy or like the associated areas of interest 135. Depending on the implementation, the route generator 220 may rank the selected areas of interest 135 using user preference data 273 and/or social networking data 274 associated with the user that generated the request for directions 120.

At 805, one or more routes are generated in response to the request using the selected one or more areas of interest. The one or more routes 165 may be generated by the route generator 220 using the selected areas of interest 135 and one or more maps 271. Any method for generating routes 165 on a map 271 may be used. Where a limited number of the selected one or more areas of interest 135 may be used to generate routes 165, the route generator 220 may generate the routes 165 from the selected areas of interest 135 using the ranking.

At 807, the one or more generated routes are presented. The one or more generated routes 165 may be presented by the map client 113 to the user associated with the request for directions 120. Where multiple routes 165 are generated, some or all of the routes 165 may be displayed to the user along with information about the areas of interest 135 that were considered when generating the routes 165. The user may then select the route 165 that they would like to use.

Figure 9:
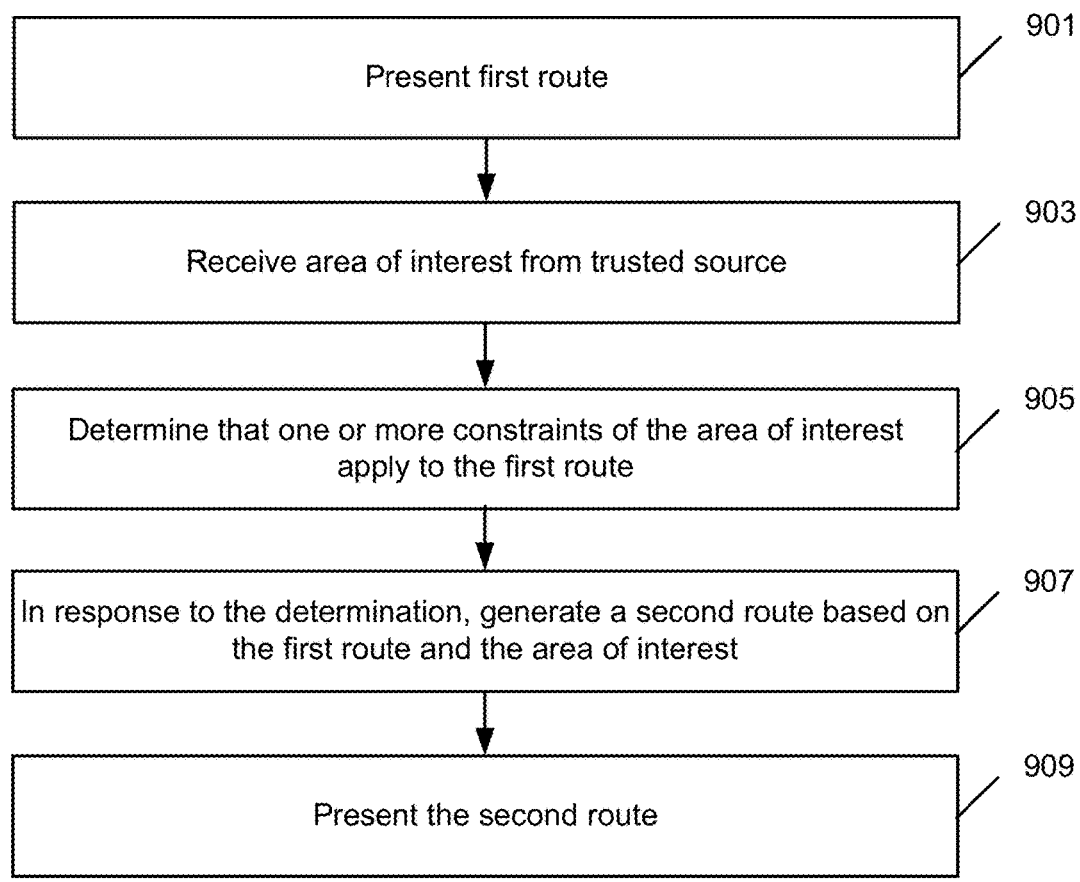
FIG. 9 is an operational flow of an implementation of a method for generating a first route and for generating a second route based on the first route and a received area of interest.

FIG. 9 is an operational flow of an implementation of a method 900 for generating a first route and for generating a second route based on the first route and a received area of interest. The method 900 may be implemented by the map engine 160.

At 901, a first route is presented. The first route may be presented by the route generator 220 on a map client 113 associated with a user. In some implementations, the first route may be presented by displaying the first route 165 on a map by map client 113. The first route may have a destination address. The first route may be generated by the route generator 220 using route preferences such as shortest distance, shortest time, avoid tolls, avoid highways, avoid traffic etc. The route preferences may have been set by the user or an administrator, for example.

At 903, an area of interest is received. The area of interest 135 may be received by the route generator 220 of the map engine 160. The area of interest 135 may be received from a trusted source 130 (e.g., a contact in a social networking application). The area of interest 135 may be received while the user is traveling on the first route 165.

At 905, that one or more constraints of the area of interest apply to the first route is determined. The determination may be made by the route generator 220 of the map engine 160. The constraints of the area of interest 135 may include time constraints and transportation mode constraints.

At 907, a second route is generated based on the first route and the area of interest. The second route may be generated by the route generator 220 of the map engine 160. The second route may include the same destination address as the first route. Depending on whether or not the area of interest 135 is positive or negative, the second route may either pass through the area of interest 135 or may avoid the area of interest 135. Depending on the implementation, the second route may also meet some or all of the route preferences used to generate the first route. Where there are multiple areas of interest 135, the route generator 220 may generate multiple additional routes, with each additional route incorporating a different subset of areas of interest 135.

At 909, the second route is presented. The second route may be presented by the map client 113 of the client device 110. The map client 113 may present the second route by displaying the second route on the map associated with the first route. The second route may be displayed along with the first route, so that the user can elect whether to continue on the first route, or switch to the second route. Where multiple additional routes are generated, the map client 113 may present some or all of the multiple additional routes and may highlight the areas of interest 135 to the user that are associated with each route.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for generating routes based on information received from trusted sources is provided. The system includes at least one computing device and a map engine. The map engine is adapted to: receive an area of interest from a trusted source, wherein the area of interest includes a time constraint and a transportation mode constraint; receive a request for directions, wherein the request includes a time and a transportation mode; determine that the time constraint and the transportation mode constraint of the area of interest apply to the time and transportation mode included in the request; and in response to the determination, generate a route in response to the request using the area of interest.

Implementations may include some or all of the following features. The trusted source may be a contact in a social networking application. The map engine adapted to receive the area of interest from the trusted source may include the map engine adapted to receive an annotated image, and to determine the area of interest from the received annotated image. The map engine adapted to receive the area of interest from the trusted source may include the map engine adapted to receive a message from the trusted source and to determine the area of interest from the received message. The map engine adapted to generate the route in response to the request using the area of interest may include the map engine adapted to generate the route that does not pass through the area of interest. The map engine adapted to generate the route in response to the request using the area of interest may include the map engine adapted to generate the route that does pass through the area of interest. The request for directions may include an origin address and a destination address, and the origin address and the destination address may not be located in the area of interest.

In an implementation, a system for generating routes based on information received from trusted sources is provided. The system includes at least one computing device and a map engine. The map engine is adapted to: present a first route; receive an area of interest from a trusted source, wherein the area of interest includes one or more constraints; determine that the one or more constraints of the area of interest apply to the first route; in response to the determination, generate a second route based on the first route and the area of interest; and present the second route.

Implementations may have some or all of the following features. The trusted source may be a contact in a social networking application. The map engine adapted to receive the area of interest from the trusted source may include the map engine adapted to receive an annotated image, and to determine the area of interest from the received annotated image. The map engine adapted to receive the area of interest from a trusted source may include the map engine adapted to receive a message from the trusted source and to determine the area of interest from the received message. The first route may pass through the area of interest, and the second route may not pass through the area of interest. The first route may not pass through the area of interest, and the second route may pass through the area of interest. The first route and the second route may have a same destination address. The one or more constraints of the area of interest may include a time constraint and a transportation mode constraint. The map engine adapted to determine that the one or more constraints of the area of interest apply to the first route may include the map engine adapted to determine that the time constraint matches a current time and determine that the transportation mode constraint matches a transportation mode associated with the first route.

In an implementation, a method for generating routes based on information received from trusted sources is provided. The method includes: receiving a request for directions by a computing device, wherein the request includes an origin address and a destination address; selecting one or more areas of interest of a plurality of areas of interest that apply to the request for directions by the computing device; generating a route in response to the request for directions using the selected one or more areas of interest by the computing device, wherein the route includes the origin address and the destination address; and presenting the generated route in response to the request for directions by the computing device.

Implementations may have some or all of the following features. The generated route may not pass through at least one of the selected one or more areas of interest. The generated route may pass through at least one of the selected one or more areas of interest. Each of the areas of interest in the plurality of areas of interest may be received from a trusted source.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for generating routes based on information received from trusted sources, comprising:
    at least one computing device; and
    a map engine adapted to:
        receive a user drawn annotated boundary of an area of interest from a trusted source, wherein the user drawn annotated boundary of the area of interest includes one or more descriptions, each description including a time constraint and a transportation mode constraint;
        receive a request for directions, wherein the request includes a time and a transportation mode;
        determine that the time constraint and the transportation mode constraint of the area of interest apply to the time and transportation mode included in the request;
        in response to the determination, generate a route in response to the request using the area of interest; and
        display the user drawn annotated boundary of an area of interest with the route.

2. The system of claim 1, wherein the trusted source is a contact in a social networking application.

3. The system of claim 1, wherein the map engine being adapted to receive the area of interest from the trusted source comprises the map engine being adapted to receive an annotated image, and to determine the area of interest from the received annotated image.

4. The system of claim 1, wherein the map engine being adapted to receive the area of interest from the trusted source comprises the map engine being adapted to receive a message from the trusted source and to determine the area of interest from the received message.

5. The system of claim 1, wherein the map engine being adapted to generate the route in response to the request using the area of interest comprises the map engine being adapted to generate the route that does not pass through the area of interest.

6. The system of claim 1, wherein the map engine being adapted to generate the route in response to the request using the area of interest comprises the map engine being adapted to generate the route that does pass through the area of interest.

7. The system of claim 1, wherein the request for directions includes an origin address and a destination address, and further wherein the origin address and the destination address are not located in the area of interest.

8. A system for generating routes based on information received from trusted sources, comprising:
    at least one computing device; and
    a map engine adapted to:
        present a first route;
        receive a user drawn annotated boundary of an area of interest from a trusted source, wherein the user drawn annotated boundary of the area of interest includes one or more descriptions, each description including one or more constraints;
        determine that the one or more constraints of the area of interest apply to the first route;
        in response to the determination, generate a second route based on the first route and the one or more constraints in the user drawn annotated boundary of the area of interest; and
        present the second route.

9. The system of claim 8, wherein the trusted source is a contact in a social networking application.

10. The system of claim 8, wherein the map engine being adapted to receive the area of interest from the trusted source comprises the map engine being adapted to receive an annotated image, and to determine the area of interest from the received annotated image.

11. The system of claim 8, wherein the map engine being adapted to receive the area of interest from a trusted source comprises the map engine being adapted to receive a message from the trusted source, and to determine the area of interest from the received message.

12. The system of claim 8, wherein the first route passes through the area of interest, and the second route does not pass through the area of interest.

13. The system of claim 8, wherein the first route does not pass through the area of interest, and the second route passes through the area of interest.

14. The system of claim 8, wherein the first route and the second route have a same destination address.

15. The system of claim 8, wherein the one or more constraints of the area of interest comprises a time constraint and a transportation mode constraint.

16. The system of claim 15, wherein the map engine being adapted to determine that the one or more constraints of the area of interest apply to the first route comprises the map engine being adapted to determine that the time constraint matches a current time and determine that the transportation mode constraint matches a transportation mode associated with the first route.

17. A method for generating routes based on information received from trusted sources, the method comprising:
    receiving a request for directions by a computing device, wherein the request includes an origin address and a destination address;
    selecting one or more areas of interest of a plurality of areas of interest having user drawn annotated boundaries that apply to the request for directions by the computing device, each user drawn annotated boundary including one or more descriptions, and each description including a time constraint and a transportation mode constraint;

generating a route in response to the request for directions using the selected one or more areas of interest by the computing device, wherein the route includes the origin address and the destination address; and presenting the generated route in response to the request for directions by the computing device.

18. The method of claim 17, wherein the generated route does not pass through at least one of the selected one or more areas of interest.

19. The method of claim 17, wherein the generated route does pass through at least one of the selected one or more areas of interest.

20. The method of claim 17, wherein each of the areas of interest in the plurality of areas of interest are received from a trusted source.

* * * * *